United States Patent [19]

Whitfield

[11] 3,845,981
[45] Nov. 5, 1974

[54] MULTI-DIRECTIONAL PANEL ADJUSTMENT MEANS
[75] Inventor: Joseph A. Whitfield, Peoria, Ill.
[73] Assignee: Caterpiller Tractor Co., Peoria, Ill.
[22] Filed: Oct. 19, 1972
[21] Appl. No.: 299,085

[52] U.S. Cl. ........ 296/28 C, 287/189.36 F, 296/102
[51] Int. Cl. ........................................... B62d 27/00
[58] Field of Search........ 296/29, 28 C, 28 G, 35 R, 296/102, 137 R; 85/51; 287/189.36 F; 49/470, 466, 62

[56] References Cited
UNITED STATES PATENTS

| 1,789,109 | 1/1931 | Moesta | 296/28 G |
| 1,811,262 | 6/1931 | DeSana | 296/29 |
| 3,077,960 | 2/1963 | Lang | 287/189.36 F |
| 3,237,983 | 3/1966 | Hollar, Jr. | 296/137 R |
| 3,493,249 | 2/1970 | Conrad, Jr. et al. | 287/189.36 F |
| 3,610,677 | 10/1971 | Hawley et al. | 296/28 C |

FOREIGN PATENTS OR APPLICATIONS

| 1,041,979 | 9/1966 | Great Britain | 296/28 C |
| 6,601,480 | 8/1966 | Netherlands | 296/28 C |
| 718,958 | 11/1954 | Great Britain | 85/51 |

Primary Examiner—David Schonberg
Assistant Examiner—David M. Mitchell
Attorney, Agent, or Firm—Phillips, Moore, Weisenberger, Lempio & Strabala

[57] ABSTRACT

A pair of first and second overlying panels are attached together by a plurality of spaced bolts which extend therethrough. A U-shaped disc is mounted on each of the bolts and is rotatably mounted in the second panel to permit its adjustment relative to the first panel. The second panel has an elastomeric sealing gasket attached to a free edge thereof which may be adjustably compressed against a structural member of a vehicle to form a tight seal thereat.

8 Claims, 3 Drawing Figures

MULTI-DIRECTIONAL PANEL ADJUSTMENT MEANS

BACKGROUND OF THE INVENTION

A track-type tractor and other types of earthworking vehicles each comprise an operator's cab, formed by joining a plurality of panels together. Various junctures of the panels, such as the abutment of the edge of a panel with the tractor's fuel tank, require elastomeric sealing gaskets to form a tight seal thereat. Conventional sealing arrangements of this type normally involve the employment of closely held manufacturing tolerances or panel adjustment means for providing the tight seal. Conventional adjustment means tend to induce a deformation of the panels and do not always function to maintain a tight seal during protracted vehicle operation.

SUMMARY OF THIS INVENTION

An object of this invention is to provide an economical and non-complex multi-directional panel adjustment means for expeditiously and accurately aligning overlying panels relative to each other. The panels are attached together by releasable fastening means which extend therethrough and the panel adjustment means comprises an adjustment member mounted on the fastening means and rotatably mounted in one of the panels for permitting multi-directional adjustment of the panels relative to each other. In the preferred embodiment of this invention, an elastomeric sealing gasket is attached to a free edge of the one panel to abut a structural member of a vehicle in sealing relationship.

BRIEF DESCRIPTION OF THE DRAWINGS

Other objects of this invention will become apparent from the following description and accompanying drawings wherein.

DETAILED DESCRIPTION

Figure 1:
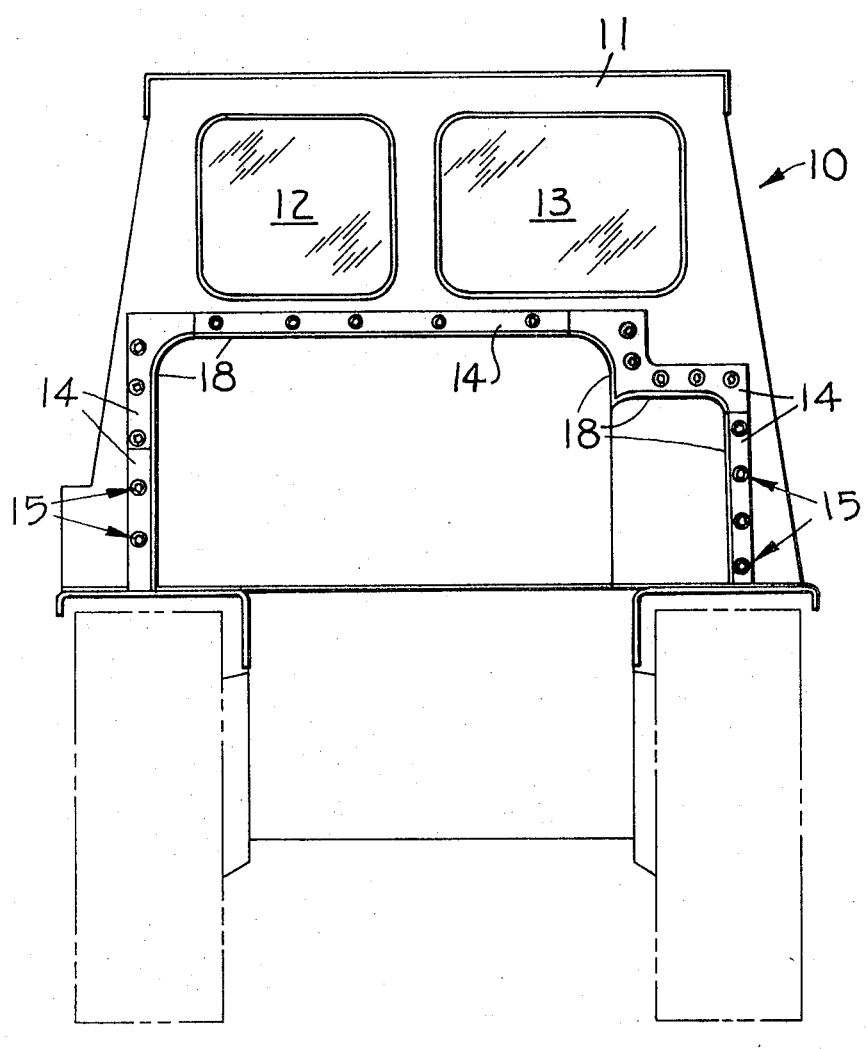
FIG. 1 is a rear elevational view of a track-type tractor employing the multi-directional panel adjustment means of this invention in the operator's cab thereof.
Figure 2:
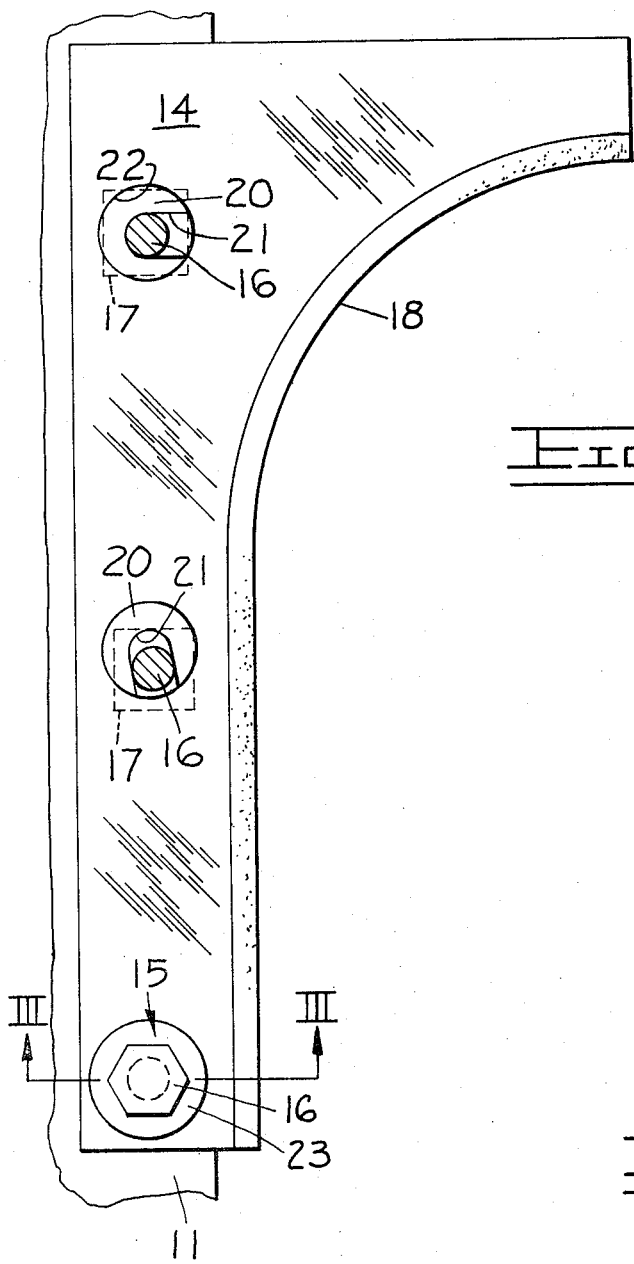
FIG. 2 is an enlarged, partially sectioned view showing three of the adjustment means attaching overlying panels of the operator's cab together.
Figure 3:
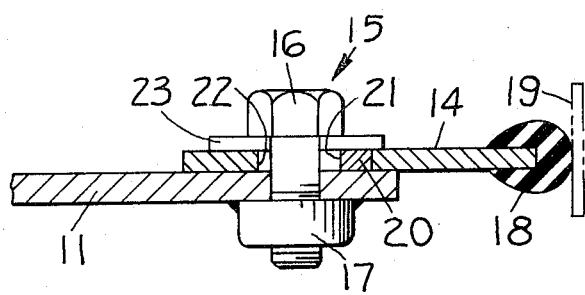
FIG. 3 is a sectional view, taken in the direction of arrows III—III in FIG. 2.

FIG. 1 illustrates an operator's cab or enclosure 10 comprising a rear or first panel 11 having rear windows 12 and 13 mounted therein. The first panel is secured to the tractor's frame (not shown) and has a plurality of second panels 14 attached thereon in overlying and overlapping relationship by releasable fastening means 15. As more clearly shown in FIGS. 2 and 3, each of the releasable fastening means preferably comprises a bolt 16 threadably attached to a nut 17, welded to an outer surface of first panel 11.

Each second panel 14 has an elastomeric sealing gasket 18 attached to a free edge thereof to abut the outer surface of a transversely disposed structural member of the tractor, such as illustrated fuel tank 19. Multi-directional panel adjustment means for selectively compressing the gaskets into sealing relationship with the outer surface of the fuel tank each comprises a flat, circular and U-shaped adjustment member or disc 20, having a thickness substantially equalling (equal to or slightly less than) the thickness of second panel 14. The disc is mounted on the shank of bolt 16 by an elongated slot 21 formed through the disc and preferably centrally disposed thereon to extend over at least one-half of the disc's diameter.

The adjustment member is rotatably mounted in a circular aperture 22, formed through second panel 14, to cooperate with the other adjustment members to selectively permit gaskets 18 to be moved into compressed, sealing contact with the fuel tank. Once the desired sealing contact is achieved, the bolts are tightened against flat washers 23, disposed between the heads of bolts 16 and second panels 14, to structurally integrate the panels into a tightly sealed portion of the operator's cab.

What is claimed is:

1. Multi-directional panel adjustment means in combination with a pair of overlying first and second panels attached together by releasable fastening means extending therethrough, said panel adjustment means comprising
an adjustment member comprising a flat, U-shaped disc having an elongated slot, open at only one end, formed therethrough, said disc mounted on said fastening means to fully abut said first panel and rotatably mounted in said second panel for permitting multi-directional adjustment of said second panel relative to said first panel, and
an elastomeric sealing gasket attached to a free edge of said second panel and compressed into sealing contact with a transversely disposed structural member of a vehicle.

2. The combination of claim 1 wherein said slot is centrally disposed on said disc and extends over at least one-half of the disc's diameter.

3. The combination of claim 1 wherein the thicknesses of said disc and said second panel are substantially equal.

4. The combination of claim 1 wherein a plurality of said second panels are attached to said first panel in overlapping relationship therewith to have the sealing gasket attached to a free edge of each of said second panels to form a continuous seal along said structural member.

5. The combination of claim 4 wherein said first and second panels form a portion of an operator's cab of a vehicle.

6. The combination of claim 1 wherein said fastening means comprises a bolt threadably attached to a nut.

7. The combination of claim 6 wherein said nut is fixedly secured to an outer surface of said first panel.

8. The combination of claim 7 further comprising an annular flat washer, having a diameter greater than said disc, disposed between a head of said bolt and said second panel.

* * * * *